(No Model.)
M. W. FOSTER.
GATE.
No. 409,185. Patented Aug. 20, 1889.
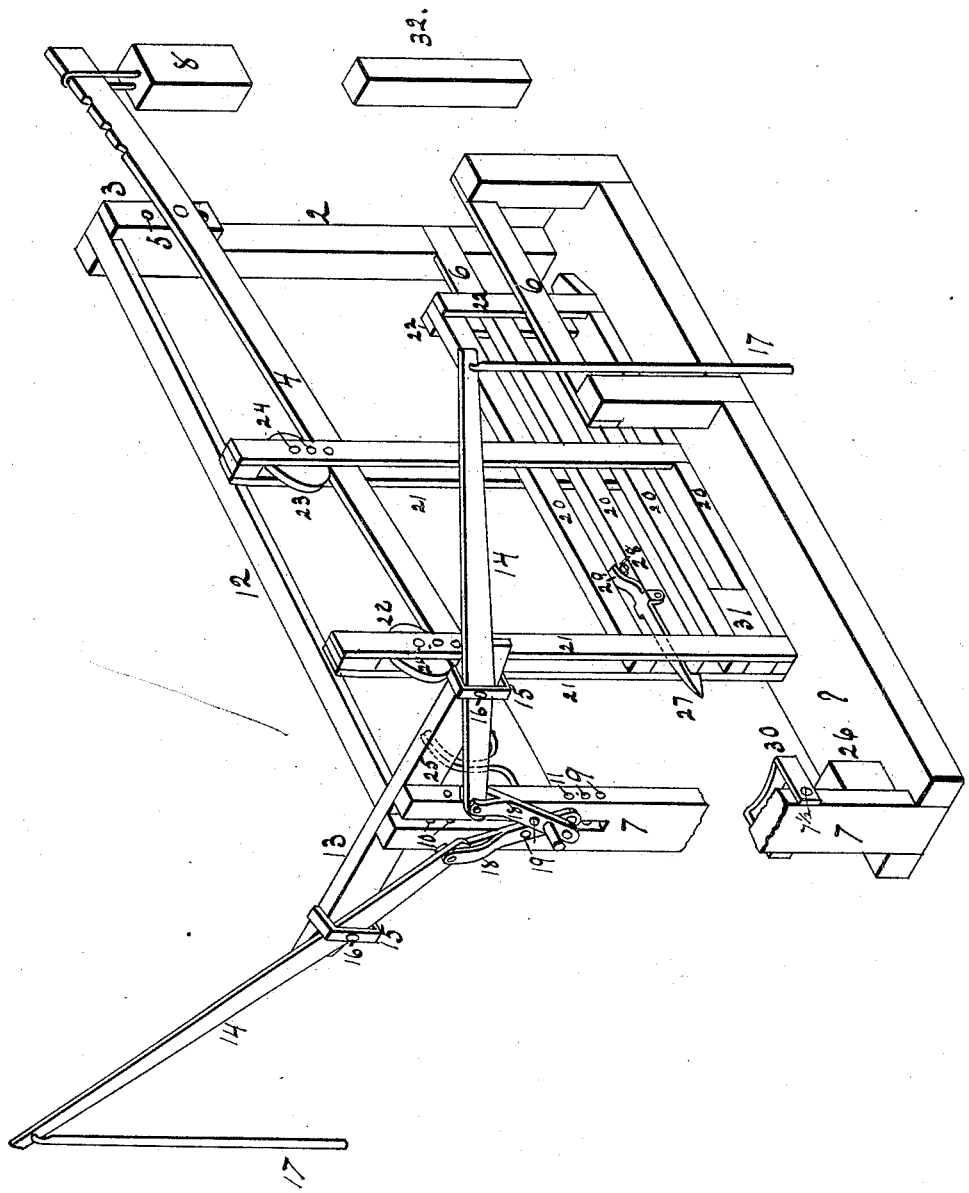
Witnesses:
V. B. Cartwell.
E. Behel.
Inventor:
Mark W. Foster.
By A. O. Behel
atty.

UNITED STATES PATENT OFFICE.

MARK W. FOSTER, OF PECATONICA, ILLINOIS.

GATE.

SPECIFICATION forming part of Letters Patent No. 409,185, dated August 20, 1889.

Application filed March 28, 1889. Serial No. 305,133. (No model.)

*To all whom it may concern:*

Be it known that I, MARK W. FOSTER, a citizen of the United States, residing at Pecatonica, in the county of Winnebago and State of Illinois, have invented certain new and useful Improvements in Gates, of which the following is a specification.

The object of this invention is to construct a gate which can be operated by hand by a person in a vehicle; and it consists in certain features of construction and combination of parts, as will be hereinafter set forth.

The figure represented in the accompanying drawing is an isometrical view of a gate embodying my invention.

The gate represented in the accompanying drawing consists of a base-beam 1. To this base-beam is secured an upright post 2 of sufficient height. Near the upper end of this upright post is secured a bar 3, and on this side of this bar is pivoted a trackway 4, and a series of holes 5 are made therein for the purpose of adjusting the end of the trackway. This trackway has its ends curved upward, so that the gate may assume nearer a horizontal position in either its open or closed position. Lengthwise bars 6 guide the gate in its movements and hold it from sidewise movement.

At the opposite end of the base-beam 1 is secured a post 7. This post is slotted near its upper end and the free end of the pivoted trackway passed through said slot. The end of the trackway extending beyond the pivot has a counterbalance-weight 8, capable of lengthwise adjustment. The post 7 has a series of holes 9 below the trackway and a series of holes 10 above the trackway. The object of these holes is to regulate the length of throw of the trackway either up or down by pins 11 passing through the holes. A lengthwise brace-bar 12 connects the posts 2 and 7 and holds them separated and gives strength to the parts. A cross-bar 13 is secured to the post 7 near its upper end. The ends of the cross-bar are beveled, and operating-levers 14 have a pivoted connection therewith. A clasp 15 spans each of the operating-levers, and a pivot-bolt 16 holds the levers in a pivotal manner by passing through the clasp and cross-bar. The beveled end of the cross-bar 13 brings the levers within reach of the attendant. Pendants 17 are suspended from the operating-levers 14 within easy reach of the operator.

The levers 14 have a connection with the pivoted trackway by means of links 18. The lower ends of the links are provided with a series of holes 19 for the purpose of vertically adjusting the trackway. By means of the connection of the pendants with the trackway the trackway can be tilted as may be required.

Upon the trackway is supported a gate composed of horizontal bars 20 and vertical bars 21 and 22, connecting the horizontal bars. The upper ends of the bars 21 support grooved rollers 23, and a series of holes 24 permit the vertical adjustment of the rollers to adjust the gate with relation to the ground. A curved hook 25 upon the upper edge of the trackway permits the front roller of the gate to pass under it, which prevents the gate's being raised by live stock. A block 26 is secured to the post 7 near the ground and serves as a stop to the gate, thereby preventing the breakage of the latch.

A latch 27, by means of its depending ears, has a pivotal connection with one of the horizontal bars of the gate. The forward end of this latch is in hook form. The other end forms an operating-handle, and a spring 28 holds the latch down in a yielding manner. By means of the handle 29 the operator can raise the latch.

A clasp 30 is pivoted to the post 7 with relation to the latch by a bolt 7½ passing through said post, so that the latch will engage the clasp and hold the gate locked. The free end of the clasp has a curved front edge, so that in the swinging of the gate it will not become unlocked.

The object of having the clasp pivoted is that in the vertical adjustment of the gate the clasp may also be adjusted and clamped in its adjusted position by the bolt 7½, or the said latch may be made of metal of sufficient spring to clamp itself against the post to bring the clasp and latch in working position.

The front of the gate is provided with a weight 31, which will counterbalance the weight of the rear end of the gate.

A post 32 is set so that the lower end of the gate in closing will come in contact with the post, thereby giving the gate a start toward its closing movement.

By this construction of a gate the operator from his seat in a vehicle or on foot can operate the gate. The various adjustments adapt the gate for use at all seasons of the year. The counterbalance-weight placed on the projecting end of the trackway may be so adjusted as to hold the gate open, so that it will require a slight uplifting movement of the operating-levers to close it.

I claim as my invention—

1. The combination of the pivoted trackway having a hook on its upper face and provided with a counterbalancing-weight, a gate supported on said trackway and engaging the hook when closed, pivoted operating-handles, and links connecting the handles with the trackway, substantially as set forth.

2. The combination of a pivoted trackway having a semicircular hook on its upper face and a gate supported on said trackway and engaging the semicircular hook when closed, substantially as set forth.

MARK W. FOSTER.

Witnesses:
A. O. BEHEL,
E. BEHEL.